United States Patent
Yasuda

(10) Patent No.: US 9,224,225 B2
(45) Date of Patent: Dec. 29, 2015

(54) MASS SPECTROMETRY DATA PROCESSING DEVICE

(71) Applicant: SHIMADZU CORPORATION, Kyoto-shi, Kyoto (JP)

(72) Inventor: Hiroyuki Yasuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 254 days.

(21) Appl. No.: 14/077,983

(22) Filed: Nov. 12, 2013

(65) Prior Publication Data
US 2015/0130810 A1    May 14, 2015

(51) Int. Cl.
  *H01J 49/00*    (2006.01)
  *G06T 11/20*    (2006.01)

(52) U.S. Cl.
  CPC ........... *G06T 11/206* (2013.01); *H01J 49/0036* (2013.01)

(58) Field of Classification Search
  CPC .................. G06T 11/206; H01J 49/0036
  USPC .......................... 250/281, 282, 288
  See application file for complete search history.

(56) References Cited

FOREIGN PATENT DOCUMENTS

| JP | 2007-46966 A | 2/2007 | |
|----|----|----|----|
| JP | 2008-298427 A | 12/2008 | |
| WO | 2009/095957 A1 | 8/2009 | |
| WO | WO 2009095957 A1 * | 8/2009 | .......... H01J 49/0036 |

OTHER PUBLICATIONS

"Liquid Chromatograph-Mass Spectrometer LCMS-ITTOF—Auto MSn Function", (online), Shimadzu Corporation, (retrieved Mar. 25, 2011), Internet <URL: http://www.an.shimadzu.co.jp/lcms/it-tof10.htm>.

"Liquid Chromatograph-Mass Spectrometer LCMS-ITTOF—High Reliability Protein Analysis", (online), Shimadzu Corporation, (retrieved Mar. 25, 2011), Internet <URL: http://www.an.shimadzu.co.jp/lcms/ittof8.htm>.

Japanese Office Action issued Apr. 8, 2014 in Japanese Patent Application No. 2011-095779.

* cited by examiner

*Primary Examiner* — Michael Maskell
(74) *Attorney, Agent, or Firm* — Sughrue Mion, PLLC

(57) ABSTRACT

A data processing device in which, on a screen where an MS spectrum for a retention time designated by the analyst is displayed in the upper area and an $MS^2$ spectrum for a precursor ion selected automatically based on the MS spectrum is displayed in the lower area, when an "On" button in a precursor parameter display selection frame in the top part is clicked, excluded ion and priority ion information for that retention time is collected and the m/z ranges and are displayed in a specified display color on the MS spectrum. As a result, it becomes possible to see at a glance whether the precursor ion indicated by upward arrow corresponds to an excluded ion or priority ion.

3 Claims, 6 Drawing Sheets

(a) Excluded ion list

| No. | Start m/z | End m/z | Start time | End time | |
|---|---|---|---|---|---|
| 1 | 420 | 422 | 0.00 | 15.00 | |
| 2 | 428 | 430 | 0.00 | 20.00 | Range corresponding to retention time: 12.05 |
| 3 | 609 | 611 | 10.00 | 25.00 | |
| 4 | 486 | 488 | 15.00 | 25.00 | |
| ⋮ | ⋮ | ⋮ | ⋮ | ⋮ | |

(b) Priority ion list

| No. | m/z | Start time | End time | |
|---|---|---|---|---|
| 1 | 525 | 0.00 | 20.00 | Range corresponding to retention time: 12.05 |
| 2 | 710 | 10.00 | 20.00 | |
| 3 | 629 | 15.00 | 25.00 | |
| ⋮ | ⋮ | ⋮ | ⋮ | |

MASS SPECTROMETRY DATA PROCESSING DEVICE

CROSS-REFERENCE TO RELATED APPLICATIONS

The entire contents of Japanese Patent Publication No. 2012-225862 to the same inventors, published Nov. 15, 2012, are incorporated herein by reference.

TECHNICAL FIELD

The present invention relates to a data processing device which processes data collected by a chromatograph-mass spectrometer using a mass spectrometer capable of $MS^n$ analysis (where n is an integer equal to or greater than 2) as the detector of a gas chromatograph or liquid chromatograph; more specifically, the present invention relates to data processing technology involving screen display processing for displaying analysis results.

BACKGROUND ART

In a triple quadrupole mass spectrometer (TQMS) or ion trap time-of-flight mass spectrometer (IT-TOFMS), ions having a specified mass-charge ratio m/z are selected as precursor ions from among the ions derived from the component to be analyzed, those precursor ions are dissociated through collision induced dissociation (CID), and the product ions produced thereby are subjected to mass spectrometry, allowing an MS/MS ($=MS^2$) spectrum to be generated. Furthermore, in an IT-TOFMS, by repeating ion selection and CID multiple times and performing mass spectrometry on the finally generated product ions, it is possible to generate an $MS^n$ spectrum, where n is 3 or greater. In the present specification, a mass spectrometer capable of $MS^n$ analysis where n is 2 or greater will be referred to as an $MS^n$ mass spectrometer.

In a chromatograph-mass spectrometer combining a liquid chromatograph (LC) or gas chromatograph (GC) with the above-described $MS^n$ mass spectrometer, if a component contained in the sample is already known, it is possible to preset the mass-charge ratio of precursor ions which are the object of $MS^n$ analysis for the holding time of that component, and to obtain the $MS^n$ spectrum of the target component. However, if the component contained in the sample is unknown, it is not possible to preset the precursor ions for performing $MS^n$ analysis, nor is it possible to obtain $MS^n$ analysis results for unknown components contained in the sample besides the target component. To address this, a device is known in the prior art which comprises a function (referred to hereinafter as auto $MS^n$ function) for automatically selecting the appropriate precursor ions based on results obtained through $MS^1$ analysis not involving CID, and performing $MS^n$ analysis in real time.

For example, Patent literature 1 describes selecting peaks in sequence starting with the one with the highest signal intensity from among multiple peaks appearing in the mass spectrum obtained through $MS^1$ analysis, automatically selecting the corresponding ion species as the precursor ion, and performing $MS^2$ analysis. Furthermore, the same literature describes selecting peaks whereof the signal intensity is within a predetermined intensity range, automatically selecting the corresponding ion species as a precursor ion, and performing $MS^2$ analysis. Furthermore, Patent literature 2 and Non-patent literature 1 describe performing filtering, on multiple peaks appearing in a mass spectrum obtained through $MS^1$ analysis, based not just on signal intensity and mass-charge ratio sequence but also on monoisotopic peaks, valence, etc., or excluding and prioritizing specified ions and then automatically selecting precursor ions and performing $MS^2$ analysis.

FIG. 7 schematically explains the auto $MS^n$ function in a common chromatograph-mass spectrometer. Here, as the precursor ion selection criteria, the two peaks with the highest signal intensity from among those peaks in the MS spectrum having a signal intensity at or above a threshold th are selected as the precursor ions. However, an excluded ion list and priority ion list are established separately, as shown in FIG. 2, and ions having a mass-charge ratio registered in the excluded ion list are not selected as precursor ions even if they meet the aforementioned criteria, and conversely, ions having a mass-charge ratio registered in the priority ion list are selected as precursor ions whenever they are present, even if they do not meet the aforementioned criteria. Normally, an excluded ion list is used to prevent selection as precursor ions of known impurity components and interfering components contained in the sample and components known in advance not to require analysis. Conversely, a priority ion list is used to ensure that even trace amounts of components which one wishes to analyze will be selected as precursor ions. It will be noted that the number of precursor ions which can be selected for a single MS spectrum is limited due to time restrictions for performing $MS^n$ analysis in real time.

It will be assumed that the MS spectrum shown in A is obtained at time t1 when the waveform of a total ion chromatogram (TIC) is obtained, as shown in FIG. 7 (a). In this MS spectrum, peak f can be mentioned as a precursor ion candidate in accordance with the signal intensity criteria described above, but assuming that the mass-charge ratio corresponding to this peak f has been registered in the excluded ion list, it will not be selected as a precursor ion. Furthermore, peak g has a signal intensity below the threshold th, but assuming the corresponding mass-charge ratio has been registered in the priority ion list, the ion corresponding to this peak g will be automatically selected as a precursor ion, and $MS^2$ analysis on this precursor ion will be performed immediately. As a result, the $MS^2$ spectrum shown in B is obtained.

It will be assumed that the MS spectrum shown in C was obtained at another time t2. This MS spectrum has five peaks with a signal intensity at or above the threshold th, and the two peaks with the highest intensity are selected in sequence, but assuming the mass-charge ratios corresponding to peaks b and d have been registered in the excluded ion list, these will be excluded and the ions corresponding to peaks a and c of next highest intensity will be automatically selected as precursor ions, and $MS^2$ analyses on these two precursor ions will be performed immediately. As a result, the two $MS^2$ spectra shown under D and E are obtained. In analysis using an auto $MS^n$ function, conventional MS analysis not involving CID is repeatedly executed, and if there are ions which meet the precursor selection parameters based on the analysis results, they are set as precursor ions and $MS^2$ analysis is performed in real time. It is possible to perform $MS^n$ analysis where n is 3 or greater by a similar method.

In a conventional chromatograph-mass spectrometer, when data collected using an auto $MS^n$ function as described above is analyzed and processed for display on the screen of a display unit, the MS spectrum obtained in the retention time designated by the analyst and the $MS^2$ spectrum for the precursor ion automatically selected based on that MS spectrum are displayed next to each other on the same screen (see Non-patent literature 2). An example of mass spectrum display of this sort is shown in FIG. 8.

In FIG. 8, in the upper area 41 inside the mass spectrum display frame 40, the MS spectrum at retention time 12.05 (min) is displayed, and in the lower area 42, an $MS^2$ spectrum using m/z 426 at the same retention time 12.05 (min) as a precursor ion is displayed. The m/z of the precursor ion is indicated by upward arrow 44 below the horizontal axis (m/z axis) of the MS spectrum in the upper area 41. This m/z 426 precursor ion was automatically selected from the MS spectrum displayed in the upper area 41, but there are multiple peaks in the MS spectrum having a signal intensity greater than the m/z 426 peak. For example, if the precursor ions were to be selected in order of signal intensity, ions corresponding to peaks of greater signal intensity should be selected, but that is not the case here, and the analyst has no way of knowing why the m/z 426 peak was selected as the precursor ion.

Of course, if the screen for setting the precursor selection parameters is open, one can view the excluded ion list, priority ion list, etc., as shown in FIG. 2, so the analyst can refer to that to check the mass-charge ratios of excluded ions and the mass-charge ratio of priority ions at the retention time being examined and the like. However, the manipulations and operations of newly opening and referring to this sort of other screen is troublesome and takes effort, and it is laborious to compare the numerical values listed in the excluded ion list and priority ion list to the MS spectrum and determine if a peak corresponds to an excluded ion or priority ion. In particular, as shown in FIG. 2, since setting of parameters with a high degree of freedom is possible, such as being able to arbitrarily set excluded ions and priority ions for each retention time range, the operation is complicated and not easy for the analyst to understand.

Furthermore, when performing $MS^3$ analysis using an auto $MS^n$ function, if a peak appearing on the $MS^2$ spectrum obtained through $MS^2$ analysis using a specified ion as a precursor ion or using an automatically selected ion as a precursor ion is a product ion due to specified neutral loss, that ion may be used as a precursor ion for performing $MS^3$ analysis. Namely, there are cases where producing a specified neutral loss is set as a precursor ion selection parameter for $MS^n$ analysis. When a precursor ion for $MS^3$ analysis is discovered automatically under such precursor ion selection parameters and the data collected by performing $MS^3$ analysis is analyzed and processed on a conventional chromatograph-mass spectrometer, three sets of analysis results are displayed next to each other on the same screen: the MS spectrum obtained at the retention time designated by the analyst, the $MS^2$ spectrum for the precursor ion automatically selected based on said MS spectrum, and the $MS^3$ spectrum for the precursor ion automatically selected based on the $MS^2$ spectrum. In this case, if there are a large number of peaks appearing in the spectrum or if a peak with a relatively low intensity is a precursor ion, there is the problem that it is difficult for the analyst to intuitively understand which peak was selected as the precursor ion.

PRIOR ART LITERATURES

Patent Literatures (Patent literature 1) Japanese Unexamined Patent Application Publication 2008-298427
(Patent literature 2) International Publication 2009/095957 pamphlet Non-Patent Literatures (Non-patent literature 1) "Liquid Chromatograph-Mass Spectrometer LCMS-IT-TOF—Auto MSn Function", (online), Shimadzu Corporation, (retrieved Mar. 25, 2011), Internet <URL: http://www.an.shimadzu.co.jp/lcms/it-tof10.htm>

(Non-patent literature 2) "Liquid Chromatograph-Mass Spectrometer LCMS-IT-TOF—High Reliability Protein Analysis", (online), Shimadzu Corporation, (retrieved Mar. 25, 2011), Internet <URL: http://www.an.shimadzu.co.jp/lcms/it-tof8.htm>

SUMMARY OF THE INVENTION

The present invention was made in view of the problem described above, its purpose being to provide a mass spectrometry data processing device capable of simplifying the manipulations and operations performed by the analyst and improving work efficiency, and reducing the burden on the analyst by making it easier for the analyst to understand and ascertain the results when data collected through chromatography-mass spectrometry is analyzed and processed to perform operations such as component identification.

The first invention made to resolve the problem described above is a mass spectrometry data processing device which processes and displays, on a display screen, data collected by comparing peaks appearing in an $MS^{m-1}$ spectrum, obtained by performing $MS^{m-1}$ analysis (2≤m≤n) over time, to predetermined precursor selection parameters and automatically selecting a precursor ion and performing $MS^m$ analysis by means of a chromatograph-mass spectrometer combining a chromatograph and a mass spectrometer capable of $MS^n$ analysis (where n is an integer equal to or greater than 2), which mass spectrometry data processing device processes data under conditions wherein excluded ions which are not to be selected as precursor ions and priority ions which are to be preferentially selected as precursor ions regardless of other conditions, have been stipulated as one of said precursor selection parameters, the mass spectrometry data processing device being characterized in that it includes:

a) a spectrum display processing means which displays an $MS^{m-1}$ spectrum for an arbitrary retention time designated by the user and an $MS^m$ spectrum for a precursor ion selected based on said $MS^{m-1}$ spectrum next to each other on the same screen;

b) an information collection means which collects information relating to excluded ions and priority ions corresponding to the retention time of the $MS^{m-1}$ spectrum and $MS^m$ spectrum displayed by said spectrum display processing means; and c) an additional display processing means which graphically displays, over the $MS^{m-1}$ spectrum displayed by said spectrum display processing means, the mass-charge ratio or mass-charge ratio range of excluded ions and priority ions at the retention time of said spectrum, collected by said information collection means.

The mass spectrometry data processing device according to the first invention can be typically made such that m=2, i.e. such that an MS spectrum (mass spectrum) and $MS^2$ spectrum are displayed next to each other by the spectrum display processing means, but m may also be 3 or greater.

Furthermore, the second invention made to resolve the aforementioned problem is a mass spectrometry data processing device which processes and displays, on a display screen, data collected by comparing peaks appearing in an $MS^{m-1}$ spectrum, obtained by performing $MS^{m-1}$ analysis (3≤m≤n) over time, to predetermined precursor selection parameters and automatically selecting a precursor ion and performing $MS^m$ analysis by means of a chromatograph-mass spectrometer combining a chromatograph and a mass spectrometer capable of $MS^n$ analysis (where n is an integer equal to or greater than 3), which mass spectrometry data processing device processes data collected by selecting, as the precursor ion for $MS^n$ analysis, the ion corresponding to a product ion peak produced from an $MS^{m-1}$ analysis precursor ion through the occurrence of neutral loss or charged loss of a predetermined mass, when such a peak appears on the $MS^{m-1}$ spectrum, and automatically performing $MS^n$ analysis, the mass spectrometry data processing device being characterized in that it includes:

a) a spectrum display processing means which displays an $MS^{m-2}$ spectrum for an arbitrary retention time designated by the user; an $MS^{m-1}$ spectrum for a precursor ion selected based on said $MS^{m-2}$ spectrum, and an $MS^m$ spectrum for a precursor ion selected based on said $MS^{m-1}$ spectrum next to each other on the same screen; and b) an additional display processing means which performs color display of the peak corresponding to the precursor ion of $MS^{m-1}$ analysis on the $MS^{m-2}$ spectrum displayed by said spectrum display processing means, and of the peak corresponding to the precursor ion of $MS^m$ analysis on the similarly displayed $MS^{m-1}$ spectrum, in a manner distinguishable from the other peaks on the respective spectrum and in the same display color.

The mass spectrometry data processing device according to the second invention can be typically made such that m=3, i.e. such that an MS spectrum (mass spectrum), $MS^2$ spectrum and $MS^3$ spectrum are displayed next to each other by the spectrum display processing means, but m may also be 4 or greater.

The mass analysis data processing device according to the first and second inventions can both be implemented by executing a special purpose computer program implementing the functions corresponding to each of the aforementioned means on a general purpose computer comprising a display unit, manipulation unit (keyboard, pointing device, etc.), and the like.

As one mode of the mass analysis data processing device according to the first invention, the aforementioned additional display processing means can display the mass-charge ratio or mass-charge ratio range of the excluded ions and priority ions in different display colors.

Furthermore, in the mass analysis data processing device according to the first invention, preferably, said additional display processing means arranges a selection operator to enable/disable display of said mass-charge ratio or mass-charge ratio range on the same screen where the $MS^{m-1}$ spectrum is displayed by said spectrum display processing means, and switches between enabling/disabling the display of said mass-charge ratio or mass-charge ratio range in response to manipulation of said operator. Furthermore, in the mass analysis data processing device according to the second invention, preferably, said additional display processing means arranges a selection operator for enabling/disabling said color display on the same screen where the $MS^{m-2}$ spectrum is displayed by said spectrum display means, and switches between enabling/disabling execution of said color display in response to manipulation of said operator.

In the mass analysis data processing device according to the first invention, for example, when the analyst manipulates the aforementioned selection operator by clicking with a pointing device such as a mouse to select display-enabled, the additional display processing means clearly displays the mass-charge ratio or range thereof for the excluded ions and priority ions at the time over the $MS^{m-1}$ spectrum that was the basis for automatically determining the precursor ion. As a result, for example, if there is a peak showing a high signal intensity on the $MS^{m-1}$ spectrum but that peak was nevertheless not selected as the precursor ion, the analyst can intuitively ascertain whether this was because that peak was included within the mass-charge ratio range of excluded ions. Furthermore, if there is a peak showing a small signal intensity on the $MS^{m-1}$ spectrum and it was still selected as the precursor ion, the analyst can intuitively ascertain if the reason was that the peak is contained within the mass-charge ratio range of a priority ion or because the peaks of higher signal intensity are contained within the mass-charge ratio range of an excluded ion.

Furthermore, in the mass analysis data processing device according to the second invention, for example, if the analyst manipulates the selection operator by clicking with a pointing device such as a mouse to select color display enabled, the additional display processing means will display the precursor ion peak on the $MS^{m-2}$ spectrum and $MS^{m-1}$ spectrum in a different color than the other peaks. Preferably, all peaks appearing on the $MS^m$ spectrum displayed alongside or all product ion peaks considered to be significant are displayed in the same color as the display color of the precursor ion peak. As a result, it will be easy to discriminate on the spectrum at what position the peak corresponding to the neutral loss or charged loss for which the analyst has designated a mass value is located, so for example, the analyst can intuitively determine if the neutral loss or charged loss is associated with the intended product ion.

Even more preferably, near some of the peaks on the $MS^m$ spectrum, for example, the peak showing the greatest intensity, a label will be displayed indicating that it is a product ion peak obtained through $MS^n$ analysis using that peak's mass-charge ratio and neutral loss or charged loss as precursor selection parameters and indicating the mass value of the neutral loss/charged loss. The analyst can thus ascertain derivation from a product ion peak at a glance.

With the mass analysis data processing device according to the first invention, it becomes possible for the analyst, through a very simple operation, to intuitively and easily understand the reason why a peak with a low signal intensity was selected as the precursor ion or conversely why a peak with a high signal intensity was not selected as a precursor ion, on the screen displaying an $MS^{m-1}$ spectrum and $MS^m$ spectrum next to each other.

Furthermore, with the mass analysis data processing device according to the second invention, it becomes possible for the analyst to intuitively and easily find out, through a very simple operation, the location of the peak due to neutral loss or charged loss on a screen displaying an $MS^{m-2}$ spectrum, $MS^{m-1}$ spectrum and $MS^m$ spectrum next to each other. As a result, the burden on the analyst when performing operations such as verifying the presence of a target component and identifying the components contained in a sample is greatly reduced, work efficiency is improved, and operating errors are also reduced, so the reliability of results is improved.

DETAILED DESCRIPTION OF THE EXEMPLARY EMBODIMENTS

Figures 1, 2:
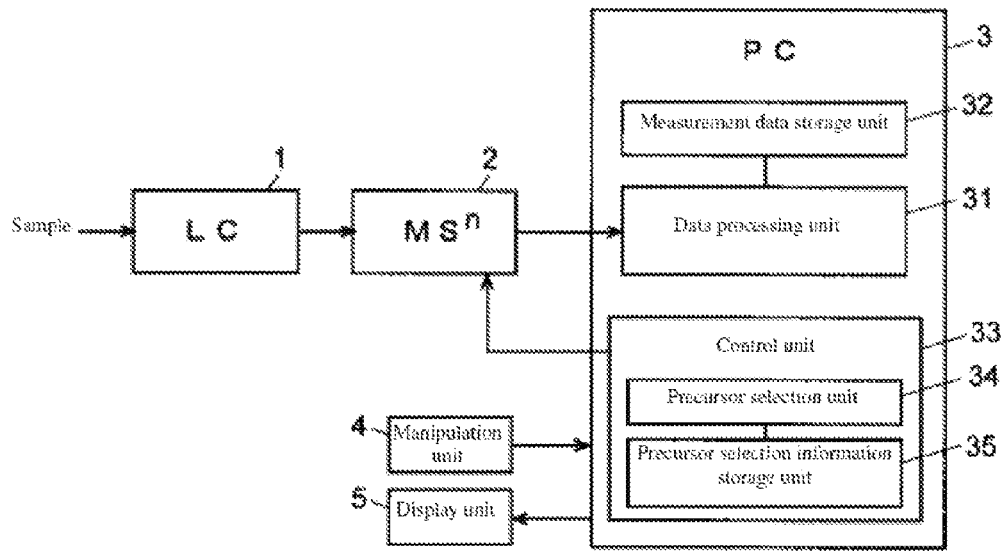
FIG. 1 A simplified diagram of an example of embodiment of an LC-MS system containing a mass analysis data processing device according to the present invention.
FIG. 2 A drawing showing an example of an excluded ion list and priority ion list which are a portion of the precursor selection parameters in the LC-MS system of the present example of embodiment.

An LC-MS system comprising the mass analysis data processing device according to the present invention will be described below with reference to the appended drawings. FIG. 1 is a simplified diagram of the LC-MS system according to the present example of embodiment.

This system comprises a liquid chromatograph (LC) 1 which separates components contained in a liquid sample over time; an $MS^n$ mass spectrometer (MS) 2 which separates and detects the separated components according to mass-charge ratio m/z and is capable of $MS^n$ analysis; and a personal computer (PC) 3 which processes the data acquired by MS 2 and controls the operation of MS 2. Specialized data processing/control software is installed on PC 3, and the functions of the illustrated data processing unit 31, measurement data storage unit 32, precursor selection unit 34, precursor selection information storage unit 35, etc., are implemented by executing this software on PC 3. Furthermore, a manipulation unit 4 comprising a keyboard and a pointing device such as a mouse, and a display unit 5, are connected to the PC 3.

MS 2 can have any configuration so long as it is capable of $MS^2$ analysis or $MS^n$ analysis where n is 3 or greater. Therefore, one may use a triple quadrupole mass spectrometer which dissociates ions by CID in a collision chamber and then performs mass separation of product ions with a quadrupole mass filter, an ion trap mass spectrometer which temporarily captures sample derived ions in an ion trap and then performs precursor ion selection, CID and product ion mass separation in the ion trap, an ion trap time-of-flight mass spectrometer which temporarily captures sample derived ions in an ion trap and then performs precursor ion selection and CID within the ion trap and performs mass separation of product ions in a time-of-flight mass spectrometer outside the ion trap, etc.

In the LC-MS system according to the present example of embodiment, prior to executing analysis, the analyst performs predetermined manipulations with manipulation unit 4, and sets precursor selection parameters for automatically selecting precursor ions. The precursor selection parameters stipulate the selection from the MS spectrum of a predetermined number of peaks to the extent possible in signal intensity order or m/z order, and additionally, an excluded ion list and priority ion list are established, and excluded ions registered in the excluded ion list are excluded from precursor ions however high their signal intensity or however early they are in m/z order, and priority ions registered in the priority ion list are preferentially selected as precursor ions so long as the peak is present, regardless of how low the signal intensity or how late they are in m/z order. Here, the precursor selection parameters stipulate selecting a predetermined number of precursor ions in order of signal intensity, and an excluded ion list as shown in FIG. 2 (a) and a priority ion list as shown in FIG. 2 (b) are established separately.

Figure 7:
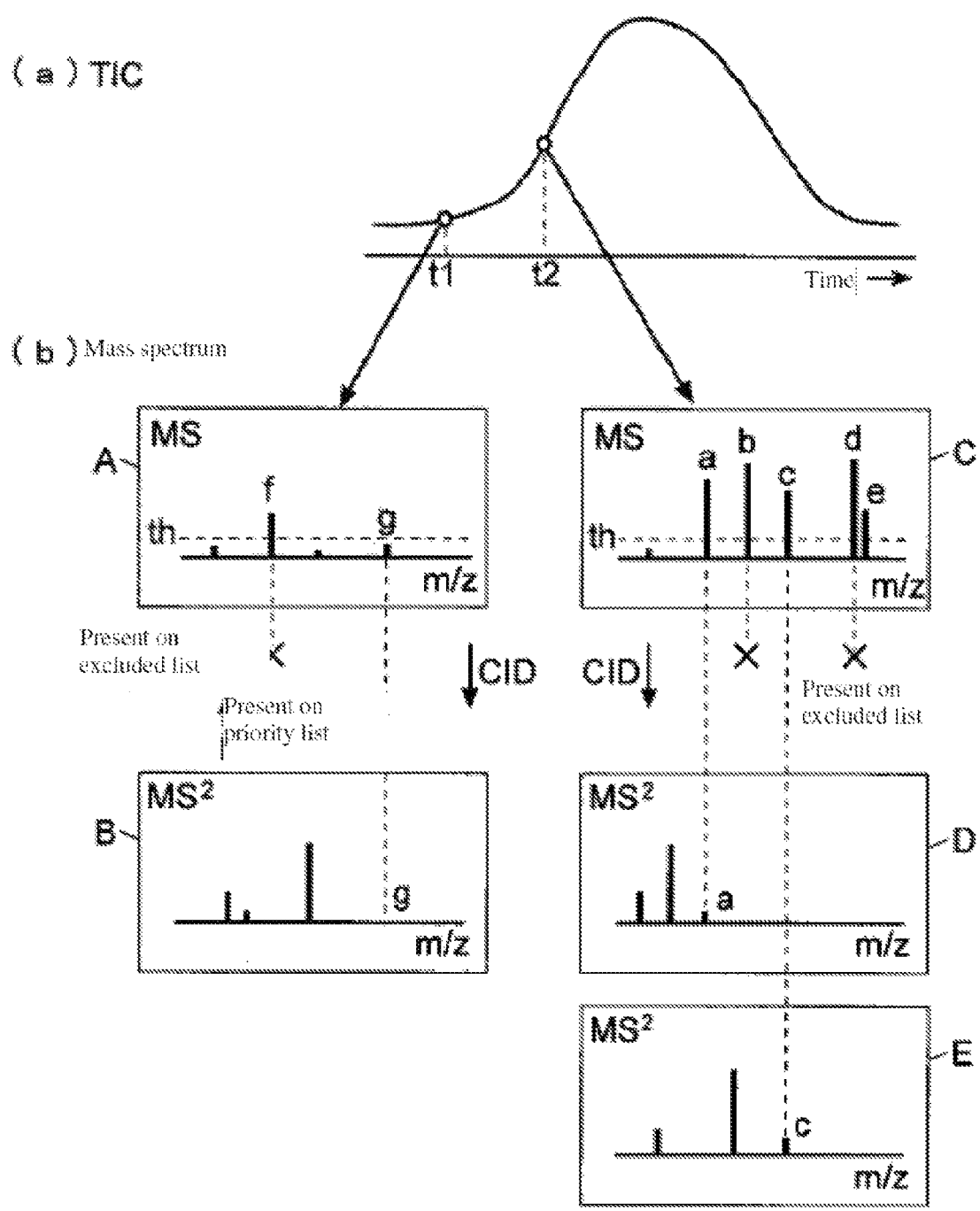
FIG. 7 A simplified explanatory diagram of the auto $MS^n$ function in a common chromatograph-mass spectrometer.

When analysis is started by an analysis start instruction and liquid sample is introduced into LC 1, components contained in the sample are separated over time and eluted as they pass through the column (not illustrated). In the MS 2, scan measurement involving mass scanning of a predetermined mass-charge ratio range is repeated at set intervals. As a result of a single scan measurement (mass scan), the data constituting one MS spectrum is obtained, as shown for example by A or C in FIG. 7. When one MS spectrum is generated in data processing unit 31, precursor selection unit 34 performs automatic selection of precursor ions according to precursor selection parameters as described above, which are stored in precursor selection information storage unit 35, and if a precursor ion satisfying the precursor selection parameters is present, $MS^2$ analysis for which that precursor ion has been set is executed in real time. Data constituting an $MS^2$ spectrum as shown by B, D and E in FIG. 7 is obtained as a result.

Therefore, by repeating scan measurement at predetermined time intervals, MS spectra are obtained at predetermined time intervals, and if a precursor ion which satisfies the precursor selection parameters is present, one or multiple $MS^2$ spectra are obtained in the period until the time of the next scan measurement. In the total ion chromatogram (TIC) shown in FIG. 7 (a), all the ion intensities contained in a single MS spectrum are added together and arranged in the time direction.

In the LC-MS system of the present example of embodiment, MS spectrum data and $MS^2$ spectrum data as described above is repeatedly collected from the point in time when a sample is introduced into the LC 1 (or a point in time delayed therefrom by a predetermined period) until a point in time suitably delayed from the end of elution of components in the sample, and that data is aggregated into one data file and is stored in measurement data storage unit 32. This sort of data collection operation does not differ in any way from conventional LC-MS systems. After completion of analysis, the measurement data stored in the measurement data storage unit 32 is read into data processing unit 31 upon instruction of the user and is made available for reanalysis for component identification, etc.

Figure 3:
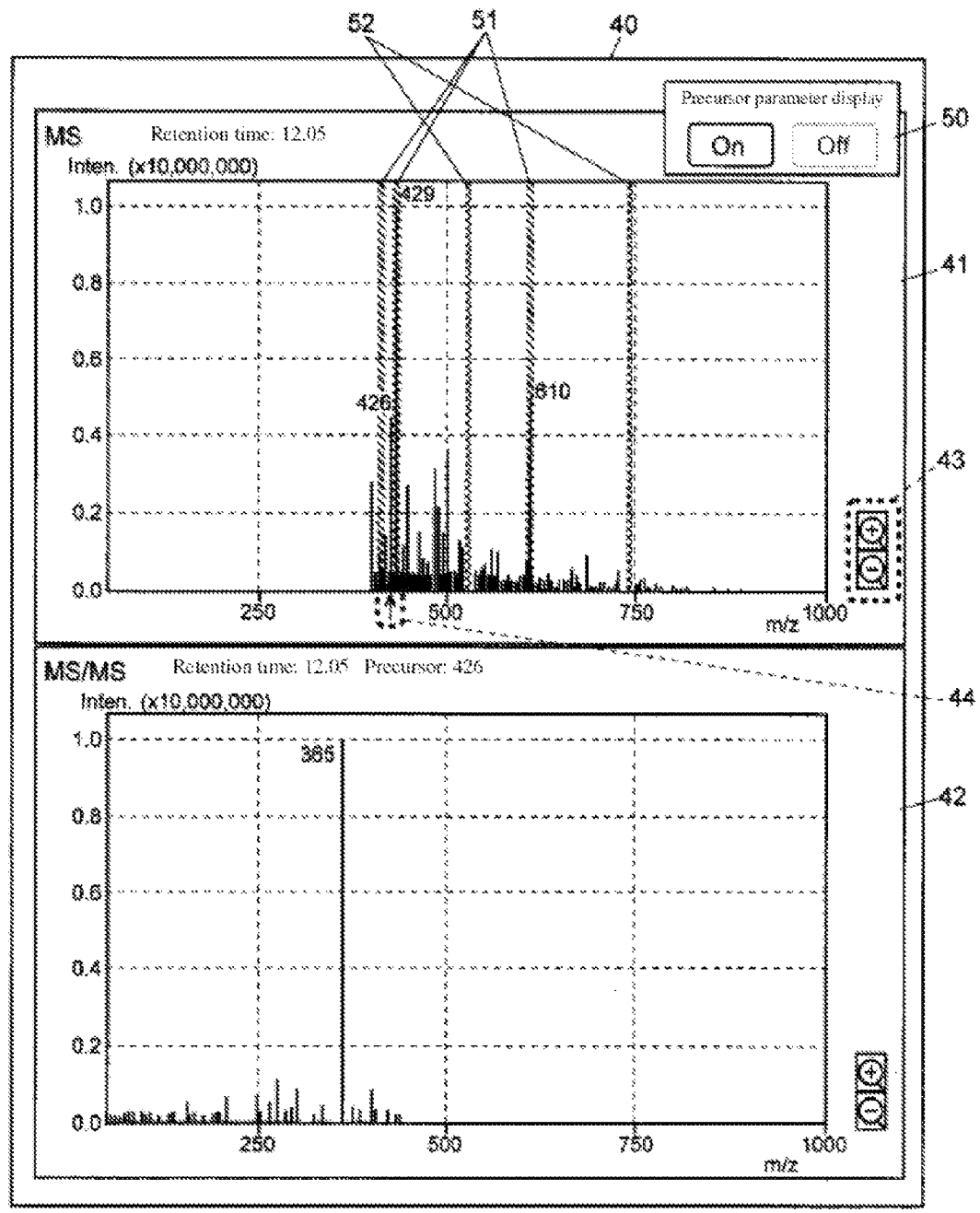
FIG. 3 A schematic showing an example of a partial analysis display screen in the LC-MS system of the present example of embodiment.

Next, the characteristic data processing operation involved in reanalysis processing in the LC-MS system of the present example of embodiment will be described. FIG. 3 is a schematic showing a portion of the reanalysis screen displayed on display unit 5 when a data file to be reanalyzed is designated and reanalysis is carried out. Mass spectrum display frame 40 shown in FIG. 3 is a portion of the reanalysis screen in which are arranged a toolbar with various command tool buttons arranged therein, a chromatograph display frame in which a TIC or extracted ion chromatogram (mass chromatograph) is displayed, etc.

Figure 8:
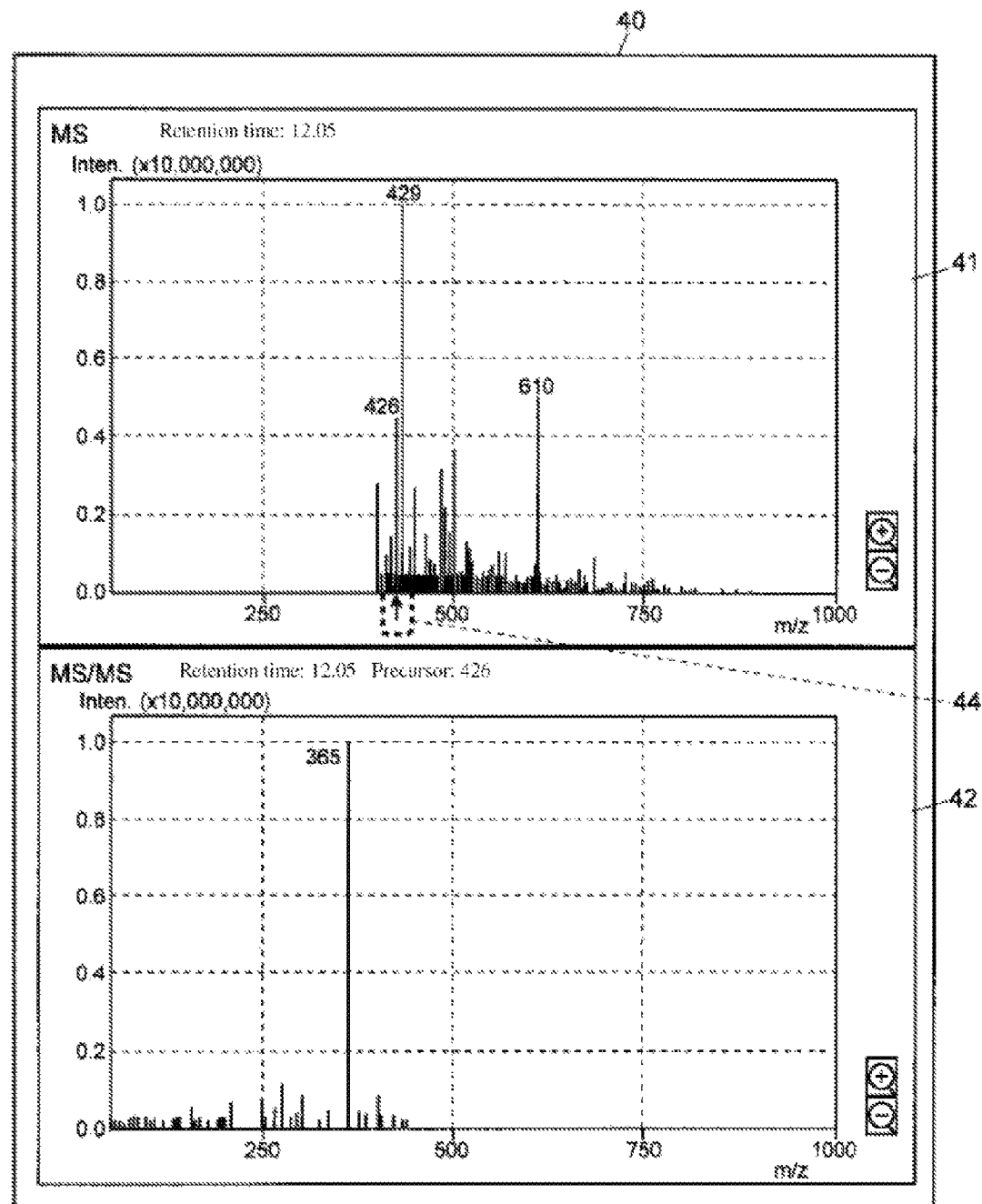
FIG. 8 A schematic illustrating an example of a partial analysis display screen in a conventional LC-MS system.

In the mass spectrum display frame 40 displayed in the LC-MS system of the present example of embodiment, a precursor parameter display selection frame 50 provided with an "On" button and "Off" button is arranged in the upper part of the upper area 41 in which the MS spectrum is displayed. When the analyst moves the cursor on the display screen over the "Off" button in the precursor parameter display selection frame 50 with the mouse of the manipulation unit 4 and performs a click operation, the data processing unit 31 displays, in the upper area 41, an MS spectrum of the same sort as in the prior art, in which overlaid display of excluded ion range and priority ion range, described below, is not performed. Therefore, the MS spectrum displayed in the upper area 41 is the same as in FIG. 8.

On the other hand, when the analyst moves the cursor on the display screen over the "On" button in the precursor parameter display frame 50 with the mouse of the manipulation unit 4 and performs a click operation, the data processing unit 31 acquires the mass-charge ratio range of excluded ions and mass-charge ratio range of priority ions associated with the retention time of the MS spectrum being displayed at the time from the precursor selection information storage unit 35. In the example of FIG. 3, the retention time is 12.05, so the mass-charge ratio ranges of three lines, No. 1 through No. 3, in the excluded ion list shown in FIG. 2 (*a*), i.e. 420-422, 428-430 and 609-611, are extracted. Similarly, the mass-charge ratio ranges of two lines, No. 1 through No. 2, in the priority ion list shown in FIG. 2 (*b*) (here, these are not ranges but mass-charge ratios), i.e. 525 and 710, are extracted.

The data processing unit 31 then performs display processing to clearly indicate the mass-charge ratio range of the excluded ions and priority ions extracted as above over the MS spectrum displayed in the upper area 41. Specifically, different display colors are determined in advance for the mass-charge ratio range of excluded ions and mass-charge ratio range of priority ions, and the background of the MS spectrum displayed in the upper area 41 is displayed in the display colors determined for the respective mass-charge ratio ranges. In FIG. 3, since display color cannot be represented, the excluded ion mass-charge ratio range 51 and priority ion mass-charge ratio range 52 are represented by filling with different patterns. This makes it possible to see at a glance the mass-charge ratio range of excluded ions and priority ions, which are one of the precursor selection parameters, on the MS spectrum, so for example, it can be immediately ascertained that the m/z 429 peak, which shows the highest signal intensity, and the m/z 610 peak, which shows the next highest signal intensity, are excluded ions. Because of this, the analyst can easily determine the reason why m/z 426 has been selected as a precursor ion despite the fact that it has relatively low signal intensity. The same holds in cases where the peak selected as a precursor ion is a priority ion.

Furthermore, the MS spectrum displayed in the upper area 41 can be enlarged or reduced in the m/z axis direction by manipulating the enlarge/reduce buttons 43 on the right, making it possible to compare the relationship between peaks and the excluded ion mass-charge ratio range 51 and priority ion mass-charge ratio range 52 in detail through enlarged display of an arbitrary m/z range.

In the above description, portions corresponding to excluded ion mass-charge ratio range 51 and priority ion mass-charge ratio range 52 were distinguished using specified display colors in the background portion of the MS spectrum displayed in the upper area 41, but instead, it is also possible to display the line color of the peaks in a predetermined display color. In addition to the method of changing the display color, the excluded ion and priority ion mass-charge ratio ranges can be distinguished by methods such as changing the display brightness (luminosity).

Next, the characteristic data processing operations involved in executing reanalysis processing in the LC-MS system of the present example of embodiment will be described by presenting another example.

Figure 5:
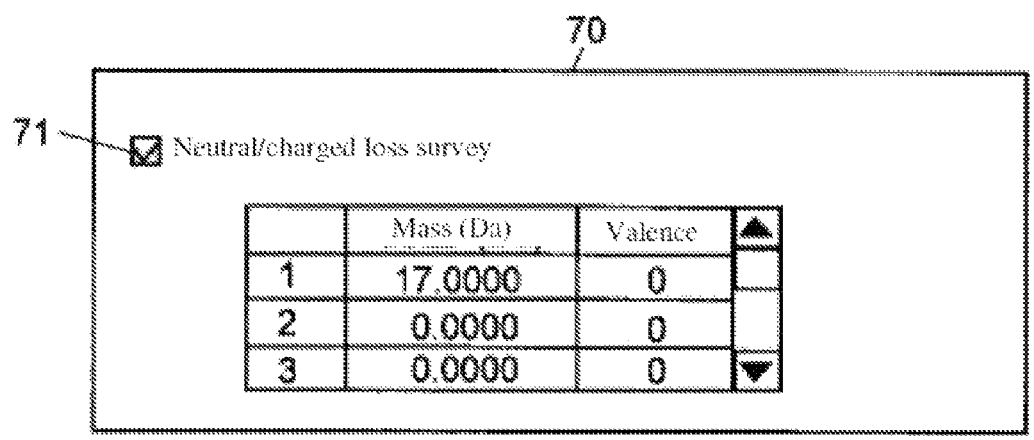
FIG. 5 is a drawing showing an example of the input screen for setting neutral loss as a precursor selection parameter in the LC-MS system of the present example of embodiment.

Here, the data to be subjected to reanalysis processing is data acquired up to the $MS^3$ spectrum using an auto $MS^n$ function as described above. Specifically, the precursor selection parameters of $MS^2$ analysis stipulate selecting ions which show maximum intensity in the $MS^1$ spectrum and the like as precursor ions, as in the example described above. Furthermore, the precursor selection parameters of $MS^3$ analysis stipulate that when product ions produced through neutral loss of specified mass in the $MS^2$ spectrum are detected, those products ions are selected as precursor ions of $MS^3$ analysis. FIG. 5 is an example of the setting screen 70 for setting the mass of neutral loss as a precursor selection parameter. If one wishes to set neutral loss (or charged loss having an electric charge) as a precursor setting parameter of $MS^3$ analysis, prior to execution of analysis, one would place a check into checkbox 71 in the neutral loss setting screen 70 shown in FIG. 5, and input numerical values for mass and valence. In this example, neutral loss of 17 Da has been set as a precursor selection parameter.

Figure 4:
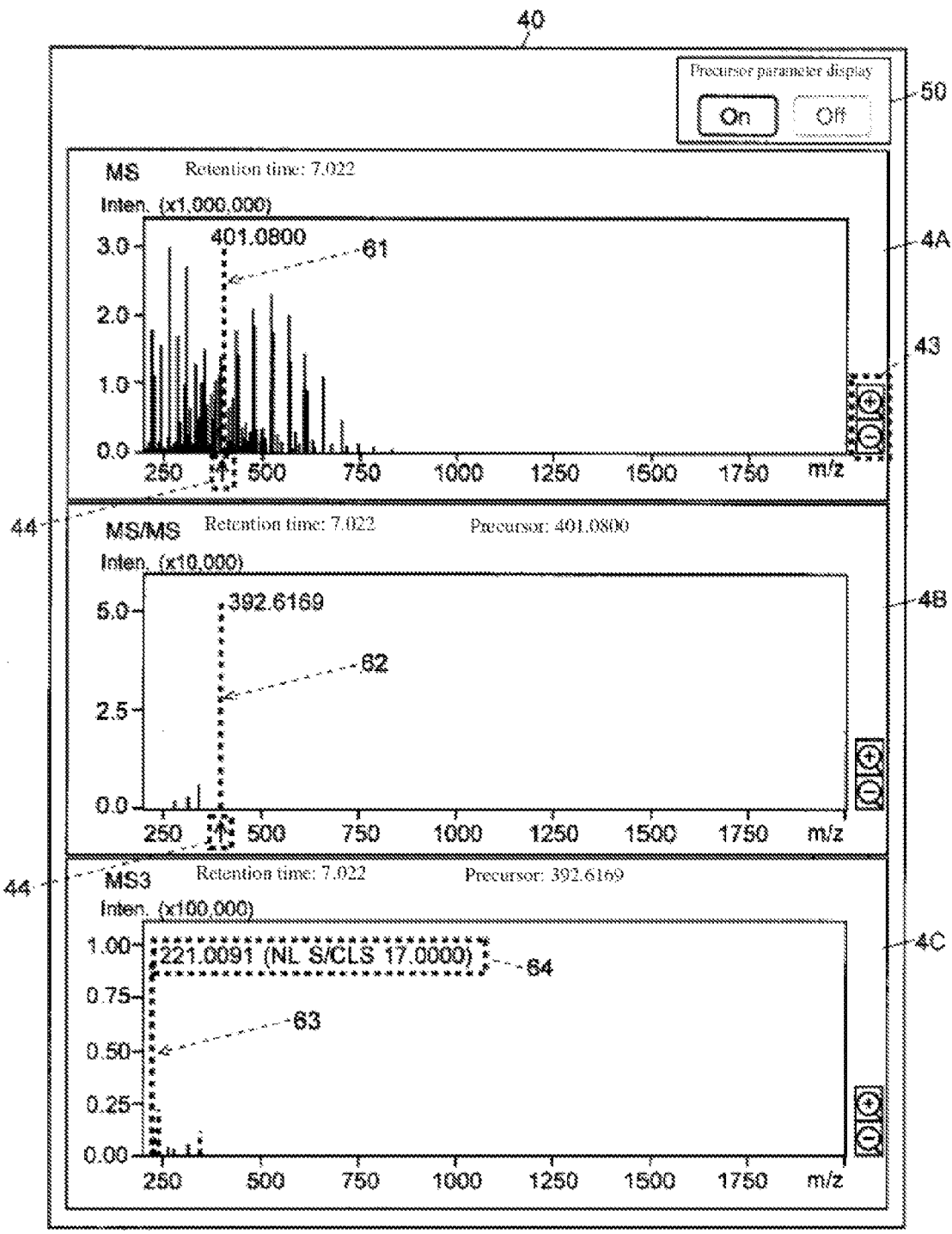
FIG. 4 A schematic showing another example of a partial analysis display screen in the LC-MS system of the present example of embodiment.

FIG. 4 is a schematic which shows a portion of the reanalysis screen displayed on display unit 5 when reprocessing data collected under precursor selection parameters as described above.

The mass spectrum display frame 40 shown in FIG. 4, just as in the case of FIG. 3, is a portion of the reanalysis screen in which are arranged a toolbar with various command tool buttons arranged therein, a chromatograph display frame in which a TIC or extracted ion chromatogram (mass chromatograph) is displayed, etc. Here, the upper area 4A displays the $MS^1$ spectrum for the retention time (in this example, 7.022 (min)) designated by the analyst, the middle section 4B displays the $MS^2$ spectrum for said retention time, and the lower area 4C displays the $MS^3$ spectrum for said retention time.

In the mass spectrum display frame 40, a precursor parameter display selection frame 50 is arranged in the top part of the upper area 4A. When the analyst moves the cursor on the display screen over the "On" button in the precursor parameter display selection frame 50 with the mouse of the manipulation unit 4 and performs a click operation, the data processing unit 31 executes precursor ion peak color display as follows. Namely, the data processing unit 31 acquires the mass-charge ratios of the $MS^2$ precursor ion and $MS^3$ precursor ion, and changes the display color of peaks 61 and 62 at the locations of the aforementioned mass-charge ratios on the $MS^1$ spectrum and $MS^2$ spectrum displayed in the upper area 4A and middle area 4B respectively to the designated color. Furthermore, at the same time, all the significant peaks (peaks at or above a predetermined intensity which can be deemed to not be noise) 63 on the $MS^3$ spectrum displayed in the lower area 4C are displayed in the same color. In FIG. 4, the color of these peaks 61, 62, 63 is represented by a thick dotted line. Furthermore, a mass label 64 containing the labeling "NL S/CLS 17.0000" is displayed near the peak with the highest ion intensity in the $MS^3$ spectrum in order to indicate that it is a product ion having the ion produced by neutral loss of 17 Da mass as a precursor ion.

Figure 6:
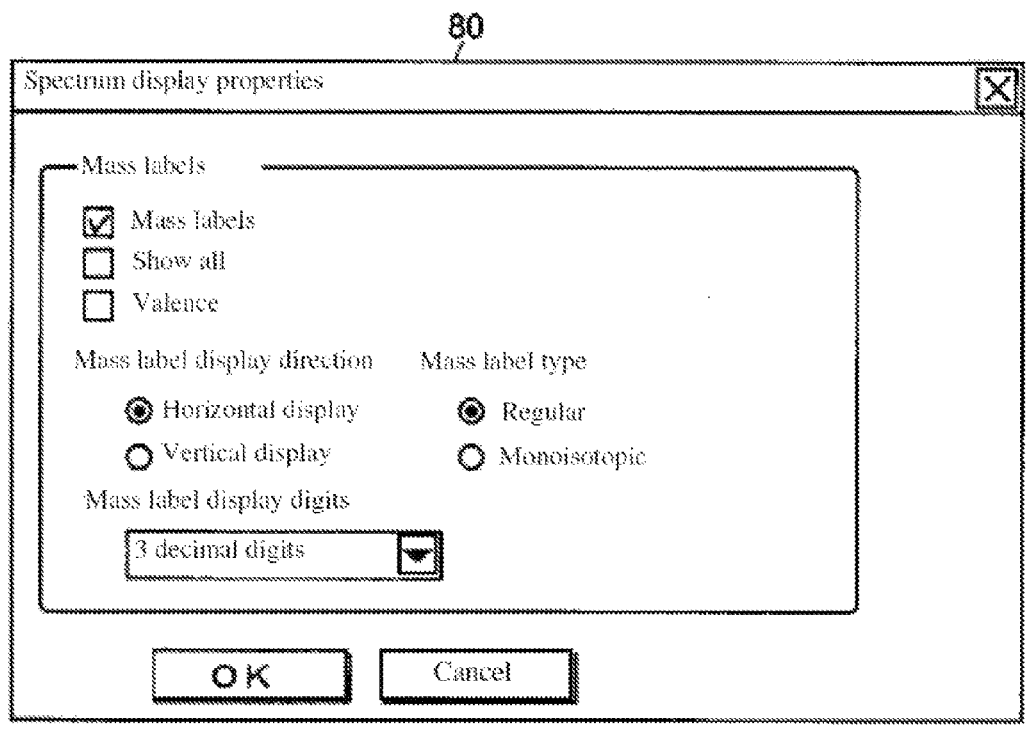
FIG. 6 A drawing showing an example of the setting screen for properties for displaying the analysis display screen in the LC-MS system of the present example of embodiment.

FIG. 6 is an example of the settings screen for enabling/disabling display of mass label 64 and setting the display format thereof. This mass label display settings screen 80 is provided independently of the precursor parameter display selection frame 50, so even when the peak representing the precursor ion is displayed in color as described above, it is possible to not display the mass label 64.

In the LC-MS system of the present example embodiment, when neutral loss or charged loss has been set as a precursor selection parameter, the specific peak selected as the precursor ion is displayed in color, thus making it possible to confirm the location of the precursor ion in the displayed mass spectrum at a glance, and also making it possible to immediately ascertain that the precursor selection parameter is a neutral loss of mass 17.

In the above example of embodiment, the present invention was applied to the processing of data collected by LC-MS, but it is obvious that the present invention can also be applied to the processing of data collected by GC-MS. Furthermore, in the above example of embodiment, information relating to precursor selection parameters was graphically displayed on the MS spectrum on the screen displaying the MS spectrum and $MS^2$ spectrum next to each other, but of course this can be expanded to the screen displaying the $MS^{m-1}$ spectrum and $MS^m$ spectrum next to each other.

Furthermore, it is clear that the above example of embodiment is no more than one example, and any modification, correction or addition made within the scope of the present invention is included within the scope of patent claims of the present application.

EXPLANATION OF REFERENCES

1 . . . Liquid chromatograph (LC)
2 . . . $MS^n$ mass spectrometer (MS)
3 . . . Personal computer (PC)
31 . . . Data processing unit
32 . . . Measurement data storage unit
33 . . . Control unit
34 . . . Precursor selection unit
35 . . . Precursor selection information storage unit
4 . . . Manipulation unit
5 . . . Display unit
40 . . . Mass spectrum display frame
41, 4A . . . Upper area
4B . . . Middle area
42, 4C . . . Lower area
43 . . . Enlarge/reduce button
44 . . . Upward arrow
50 . . . Precursor parameter display selection frame
64 . . . Mass label
70 . . . Neutral loss settings screen
71 . . . Checkbox
80 . . . Mass label display settings screen

What is claimed is:

1. A mass spectrometry data processing device which processes and displays, on a display screen, data collected by comparing peaks appearing in an $MS^{m-1}$ spectrum, obtained by performing $MS^{m-1}$ analysis ($2 \leq m \leq n$) over time, to predetermined precursor selection parameters and automatically selecting a precursor ion and performing $MS^m$ analysis by means of a chromatograph-mass spectrometer combining a chromatograph and a mass spectrometer capable of $MS^n$ analysis (where n is an integer equal to or greater than 2), which mass spectrometry data processing device processes data under conditions wherein excluded ions which are not to be selected as precursor ions and priority ions which are to be preferentially selected as precursor ions regardless of other conditions, have been stipulated as one of said precursor selection parameters, the mass spectrometry data processing device comprising:
a) a spectrum display processing means which displays an $MS^{m-1}$ spectrum for an arbitrary retention time designated by the user and an $MS^m$ spectrum for a precursor ion selected based on said $MS^{m-1}$ spectrum next to each other on the same screen;
b) an information collection means which collects information relating to excluded ions and priority ions corresponding to the retention time of the $MS^{m-1}$ spectrum and $MS^m$ spectrum displayed by said spectrum display processing means; and
c) an additional display processing means which graphically displays, over the $MS^{m-1}$ spectrum displayed by said spectrum display processing means, the mass-charge ratio or mass-charge ratio range of excluded ions and priority ions at the retention time of said spectrum, collected by said information collection means.

2. The mass spectrometry data processing device described in claim 1, characterized in that said additional display processing means arranges a selection operator to enable/disable display of said mass-charge ratio or mass-charge ratio range on the same screen where the $MS^{m-1}$ spectrum is displayed by said spectrum display processing means, and switches between enabling/disabling the display of said mass-charge ratio or mass-charge ratio range in response to manipulation of said operator.

3. A mass spectrometry data processing device which processes and displays, on a display screen, data collected by comparing peaks appearing in an $MS^{m-1}$ spectrum, obtained by performing $MS^{m-1}$ analysis ($3 \leq m \leq n$) over time, to predetermined precursor selection parameters and automatically selecting a precursor ion and performing $MS^m$ analysis by means of a chromatograph-mass spectrometer combining a chromatograph and a mass spectrometer capable of $MS^n$ analysis (where n is an integer equal to or greater than 3), which mass spectrometry data processing device processes data collected by selecting, as the precursor ion for $MS^n$ analysis, the ion corresponding to a product ion peak produced from an $MS^{m-1}$ analysis precursor ion through the occurrence of neutral loss or charged loss of a predetermined mass, when such a peak appears on the $MS^{m-1}$ spectrum, and automatically performing $MS^n$ analysis, the mass spectrometry data processing device comprising:
a) a spectrum display processing means which displays an $MS^{m-2}$ spectrum for an arbitrary retention time designated by the user; an $MS^{m-1}$ spectrum for a precursor ion selected based on said $MS^{m-2}$ spectrum, and an $MS^m$ spectrum for a precursor ion selected based on said $MS^{m-1}$ spectrum next to each other on the same screen; and
b) an additional display processing means which performs color display of the peak corresponding to the precursor ion of $MS^{m-1}$ analysis on the $MS^{m-2}$ spectrum displayed by said spectrum display processing means, and of the peak corresponding to the precursor ion of $MS^m$ analysis on the similarly displayed $MS^{m-1}$ spectrum, in a manner distinguishable from the other peaks on the respective spectrum and in the same display color.

* * * * *